(12) United States Patent
Hori et al.

(10) Patent No.: US 11,284,599 B2
(45) Date of Patent: Mar. 29, 2022

(54) ANIMAL TOILET USAGE STATUS MANAGEMENT SYSTEM

(71) Applicant: Hachi Tama Inc., Fujisawa (JP)

(72) Inventors: Koji Hori, Fujisawa (JP); Teruki Hirahata, Fujisawa (JP); Atsushi Hiroyama, Fujisawa (JP)

(73) Assignee: Hachi Tama Inc., Fujisawa (JP)

( * ) Notice: Subject to any disclaimer, the term of this patent is extended or adjusted under 35 U.S.C. 154(b) by 185 days.

(21) Appl. No.: 16/616,389

(22) PCT Filed: Aug. 6, 2019

(86) PCT No.: PCT/JP2019/030884
§ 371 (c)(1),
(2) Date: Nov. 22, 2019

(87) PCT Pub. No.: WO2020/158015
PCT Pub. Date: Aug. 6, 2020

(65) Prior Publication Data
US 2020/0236897 A1    Jul. 30, 2020

(51) Int. Cl.
*A01K 1/01* (2006.01)
*G01G 19/52* (2006.01)
*A01K 29/00* (2006.01)

(52) U.S. Cl.
CPC .......... *A01K 1/0107* (2013.01); *A01K 29/005* (2013.01); *G01G 19/52* (2013.01)

(58) Field of Classification Search
CPC .... A01K 1/0107; A01K 29/005; A01K 1/031; G01G 19/52
See application file for complete search history.

(56) References Cited

U.S. PATENT DOCUMENTS

| 9,927,302 B1* | 3/2018 | Hall | E03D 11/13 |
| 2013/0333625 A1* | 12/2013 | Baxter | A01K 1/011 119/166 |
| 2019/0191660 A1* | 6/2019 | Takada | A01K 1/011 |

FOREIGN PATENT DOCUMENTS

| JP | 2017153420 A | * | 9/2017 |
| JP | 6392475 B1 | | 9/2018 |

* cited by examiner

*Primary Examiner* — Monica L Barlow
(74) *Attorney, Agent, or Firm* — Masuvalley & Partners

(57) ABSTRACT

The present invention relates to an animal toilet usage status management system, which is an animal toilet usage status management system including an animal toilet and a management server, wherein the animal toilet has a hole penetrating in the vertical direction at the bottom of the formed upper container, a lower container that receives urine passing through the hole, and a weight measuring unit that measures the weight of the upper container, the management server including a calculating part configured to calculate animal body weight and excretion information based on the measured weight transition change of the upper container.

7 Claims, 17 Drawing Sheets

FIG. 9

Usage status management DB

| User ID | Cat ID | name | type | Birth date | sex | Body weight (kg) | Excretion amount (mg) | | Number of excretion | |
|---|---|---|---|---|---|---|---|---|---|---|
| | | | | | | | Urine amount | Feces amount | Number of urination | Number of feces |
| 001 | 01 | Mozuku | Exotic short hair | 2015/4/1 | Male | 3.25 | 120 | 220 | 3 | 3 |
| | 02 | Momo | 〃 | 2017/12/25 | Female | 4.05 | 50 | 150 | 2 | 2 |
| | 03 | Tama | 〃 | 2015/4/5 | Male | 3.81 | 30 | 90 | 2 | 2 |
| 002 | 01 | Tama | 〃 | 2014/8/1 | Male | 3.80 | 28 | 56 | 1 | 1 |
| 003 | 01 | Hana | 〃 | 2015/2/1 | Female | 3.95 | 20 | 0 | 1 | 0 |
| | 02 | Maron | 〃 | 2016/11/11 | Female | 4.25 | 110 | 100 | 2 | 1 |
| | 03 | Sakura | 〃 | 2012/4/1 | Female | 4.12 | 0 | 0 | 0 | 0 |
| ⋯ | | | | | | | | | | |

ANIMAL TOILET USAGE STATUS MANAGEMENT SYSTEM

RELATED APPLICATIONS

This application is the U.S. National Phase of and claims priority to International Patent Application No. PCT/JP2019/30884, International Filing Date Aug. 6, 2019, which claims benefit of Japanese Patent Application No. JP2019-13707 filed Jan. 30, 2019, both of which are incorporated herein by reference in their entireties.

TECHNICAL FIELD

The present invention relates to an animal toilet usage status management system.

BACKGROUND ART

In recent years, the number of owners who keep dogs and cats as pets in their homes is increasing. For this reason, home-use pet toilets (or toilet for cats) with various functions such as a deodorant function for removing odor components and an automatic cleaning function for excrement are widely used.

Here, one of the painful problems of the head is the cat's health problem, especially to the owner who owns the "cat". Especially in the case of cats, there are many diseases of urology and there are data that indicate that nearly half of them experience urological diseases.

With respect to prophylactic of illness of urinal system, one of important things that the owner can do is to keep the toilet clean. A cat is known as an animal that likes clean circumstance, and if the toilet is dirty the cat may be stressed, so the owner needs to keep checking the daily toilets and keeping the toilet clean at all times.

In addition, signs and symptoms of urological diseases (ex. renal failure) in cats include phenomena such as increased frequency and amount of excretion and weight loss. For this reason, the owner may always observe the number of toilets and excretion of the cat, or regularly measure the weight, and if any abnormalities are found in the cat, promptly consult a veterinarian. desirable.

As one of the techniques related to animal toilets capable of measuring the excretion amount and body weight of pets and the like, for example, Patent Document 1 discloses a weight sensor for body weight for measuring the weight of a cat and the amount of urination of a cat. A cat litter having a weight sensor for urination for measuring urine is described.

PRIOR ART DOCUMENTS

Patent Literature

[Patent Document 1] Japanese Patent No. 6392475

DISCLOSURE OF INVENTION

Problem to be Solved by Invention

According to the invention described in Patent Document 1, the urine weight sensor measures the weight of urine is installed in the urine recovery tray excrement (urine) falls, the weight sensor for body weight is installed in the cat toilet to measure the weight of the cat.

However, since the weight sensor for body weight for measuring the body weight of the cat and the weight sensor for urination for measuring the amount of urination of the cat are used, the structure is likely to be complicated and the cost may increase.

The present invention has been proposed in view of the above points, and in one aspect, the purpose is to provide an animal toilet usage management system for accurately measuring the body weight and excretion amount of an animal using one weighing scale.

Means to Solve the Problem

In order to solve the above problems, an animal toilet usage status management system according to the present invention is a cat animal toilet usage status management system including a cat animal toilet and a management server, wherein the animal toilet An upper container in which a hole penetrating in the vertical direction is formed at the bottom, a lower container for receiving urine passing through the hole, four first weight measuring means for measuring the weight of the upper container.

To solve the above problems, animal toilet usage management system according to the present invention, a cat animal toilet, a cat animal toilet management system including a management server, the animal toilet, a upper container hole penetrating in the vertical direction is formed on the bottom, a lower container undergoing urination passing through the hole, and a four first weight measuring means for measuring the weight of the upper container, Provided, the management server, based on the weight transition change of the synthetic value of the weight of the upper container measured by each of the four first weight measuring means, and a calculating means for calculating the amount of urination of animals without a second weight measuring means for measuring the weight of the lower container, the composite value of the weight is measured due to vibration due to the sanding action of the cat in the animal toilet has a shake width of the weight, The swing width of the weight measured at a certain point varies larger than a predetermined width than the front and rear point of the point, among the four first weight measuring means, only one of the first weight measuring means when the swing width of the fluctuating weight is measured, it is a value that is level-corrected based on the weight measured at the time before and after the time.

Advantage of the Invention

According to the embodiment of the present invention, it is possible to provide an animal toilet or the like that accurately measures an animal's body weight and excretion amount using one weighing scale.

BRIEF DESCRIPTION OF DRAWINGS

FIG. 9 is a diagram showing a data example of a usage status management DB 207*a* according to the present embodiment.

BEST MODE FOR CARRYING OUT THE INVENTION

Embodiments will be described in detail with reference to the drawings. In the following embodiments, a case of a cat will be described in detail as an example of a pet.

<System Configuration>

(Cat Toilet)

Figure 1:
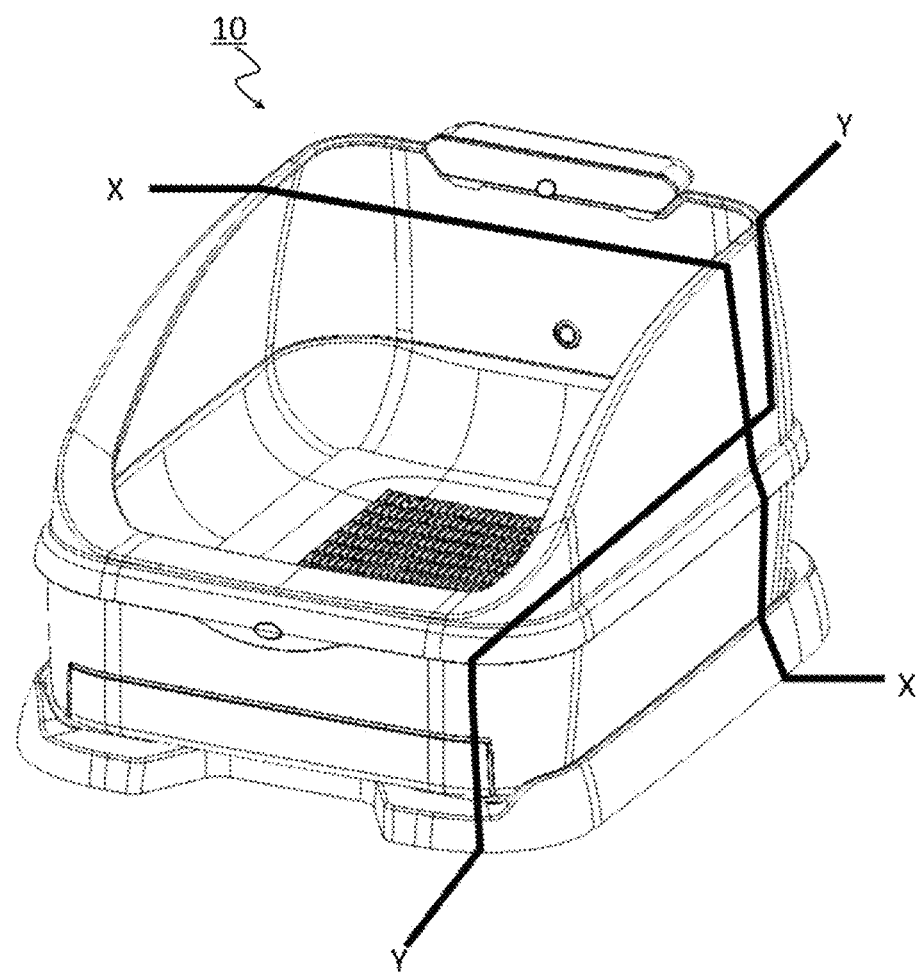
FIG. 1 is a diagram showing an overall external appearance of a cat toilet according to the present embodiment.
Figure 2:
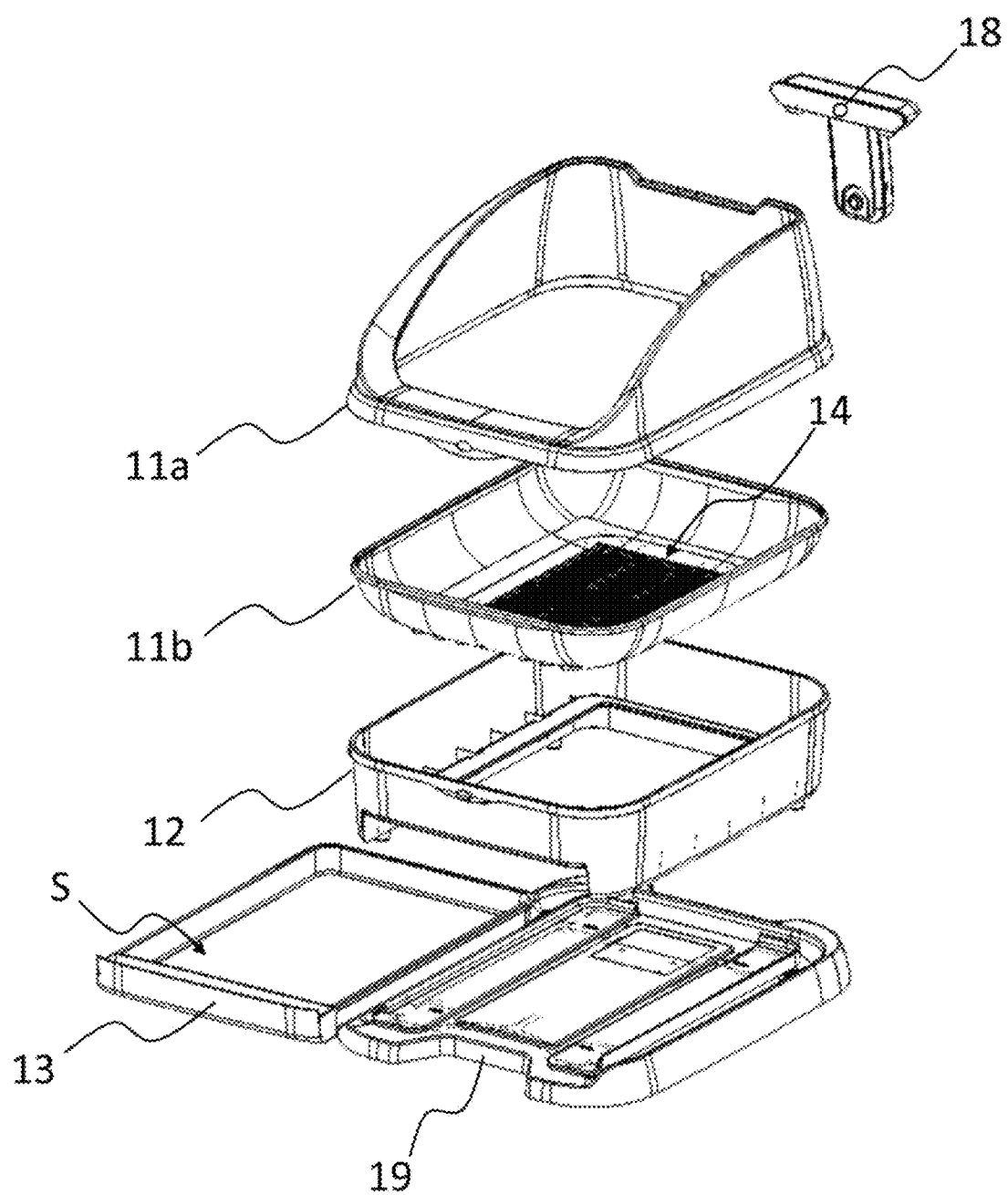
FIG. 2 is a diagram showing an example of an overall component configuration of a cat toilet according to the present embodiment.

FIG. 1 is a view showing the overall external appearance of the cat toilet according to the present embodiment. FIG. 2 is a diagram showing an example of an overall component configuration of the cat toilet according to the present embodiment. The same symbols are assigned to the same parts.

The cat toilet 10 is a multilayered fully automated toilet developed for cats. In the case of a multilayer type (for example, two-layer type), an upper layer case 11*a* and an upper layer toilet container 11*b* are provided on the upper layer of the toilet, and cat sand (not shown) is placed on the upper layer toilet container 11*b*. A lower-layer toilet container 12 and a urine collection tray 13 are provided in the lower layer of the toilet, and a pet sheet S such as a commercial product having water absorption and deodorizing effects is laid on the urine collection tray 13 that can be pulled out from the sensor plate 19. When the cat excretes, the feces are received by the cat sand of the upper toilet container 11*b*, and the urine is absorbed falling into the pet sheet S of the urine recovery tray 13 passes through the manure separation hole (mesh) 14 provided at the bottom of the upper toilet container 11*b*.

The cat toilet 10 can be installed at an appropriate place in a facility where the cat toilet 10 is supposed to be used, such as in a household, animal hospital, a pet hotel, an animal protection facility, or the like. With respect to the number of cat toilets installed, there are many owners who install multiple toilets such as the cat toilet 10-1 and the cat toilet 10-2, even in the case of owning one cat, needless to say, in the case of owning plurality of cats in recent years.

Furthermore, the cat toilet 10 according to the present embodiment has an aspect of an IoT device including a camera 18 and a sensor plate 19 in addition to the original function (excretion place from a cat) as such a toilet. It has a function to manage the toilet usage status (cat body weight, excretion amount, etc.).

Figure 3:
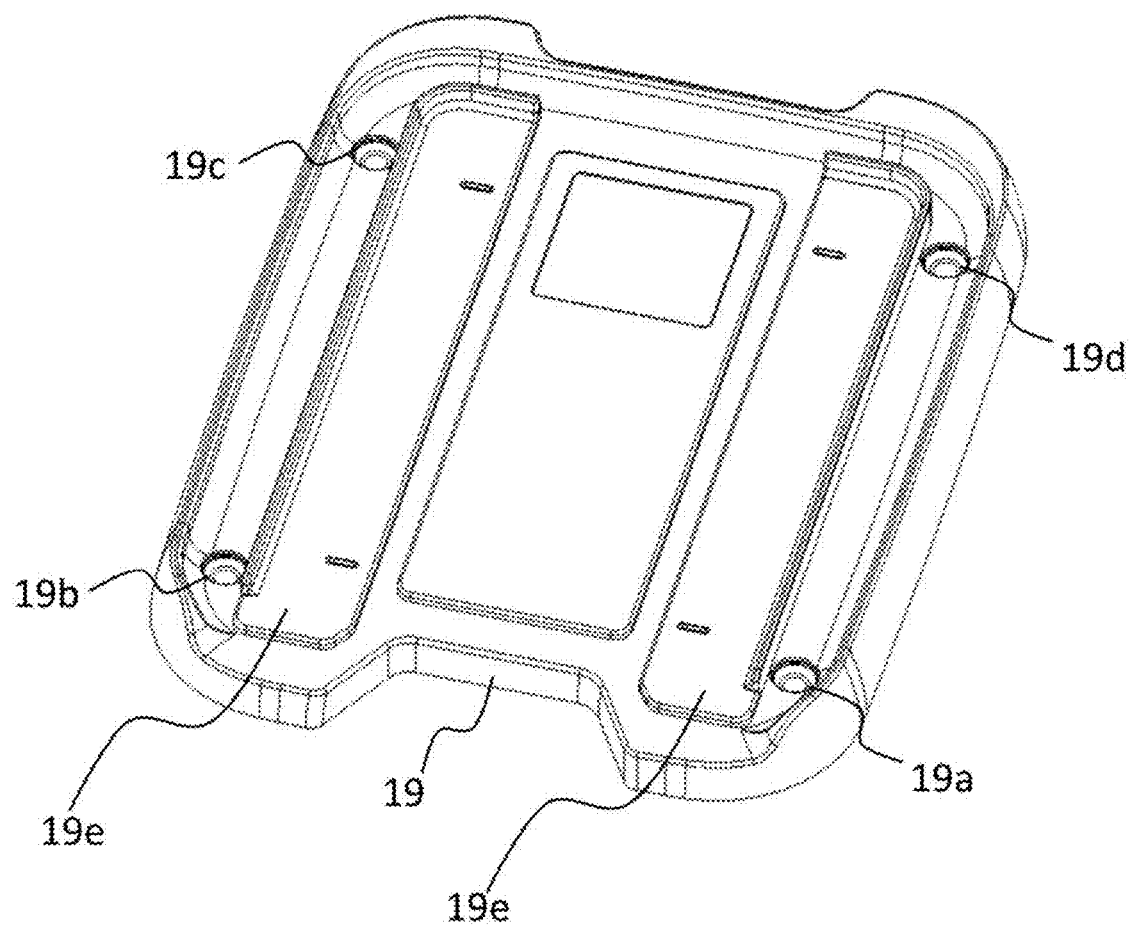
FIG. 3 is a diagram showing a component configuration example of a sensor plate of a cat toilet according to the present embodiment.

FIG. 3 is a diagram showing a component configuration example of a sensor plate of the cat toilet according to the present embodiment. Sensor plate 19 is a plate to be installed in the bottom layer (bottom) as a whole cat toilet 10. As shown in FIG. 3, the outer four corners of the sensor plate 19, the weight sensor 19*a*~19*d* as an instrument for measuring the load is one by one each, a total of four are provided. Further, the sensor plate 19, the mount portion 19*e* for placing the urine recovery tray 13 on the sensor plate 19 is provided.

In the present embodiment, for one purpose such as load balancing, in the outer four corners of the sensor plate 19, but is provided with four weight sensors of the same type, in the central portion of the sensor plate 19, the weight sensor it is also possible to provide only one. Or it may be other numbers otherwise. However, as described later, since the sensor plate 19 must be a structure that does not take the load of the urine recovery tray 13, the weight sensor on the sensor plate 19, symmetrical across the urine recovery tray 13 sliding back and forth it may be arranged.

Figure 4:
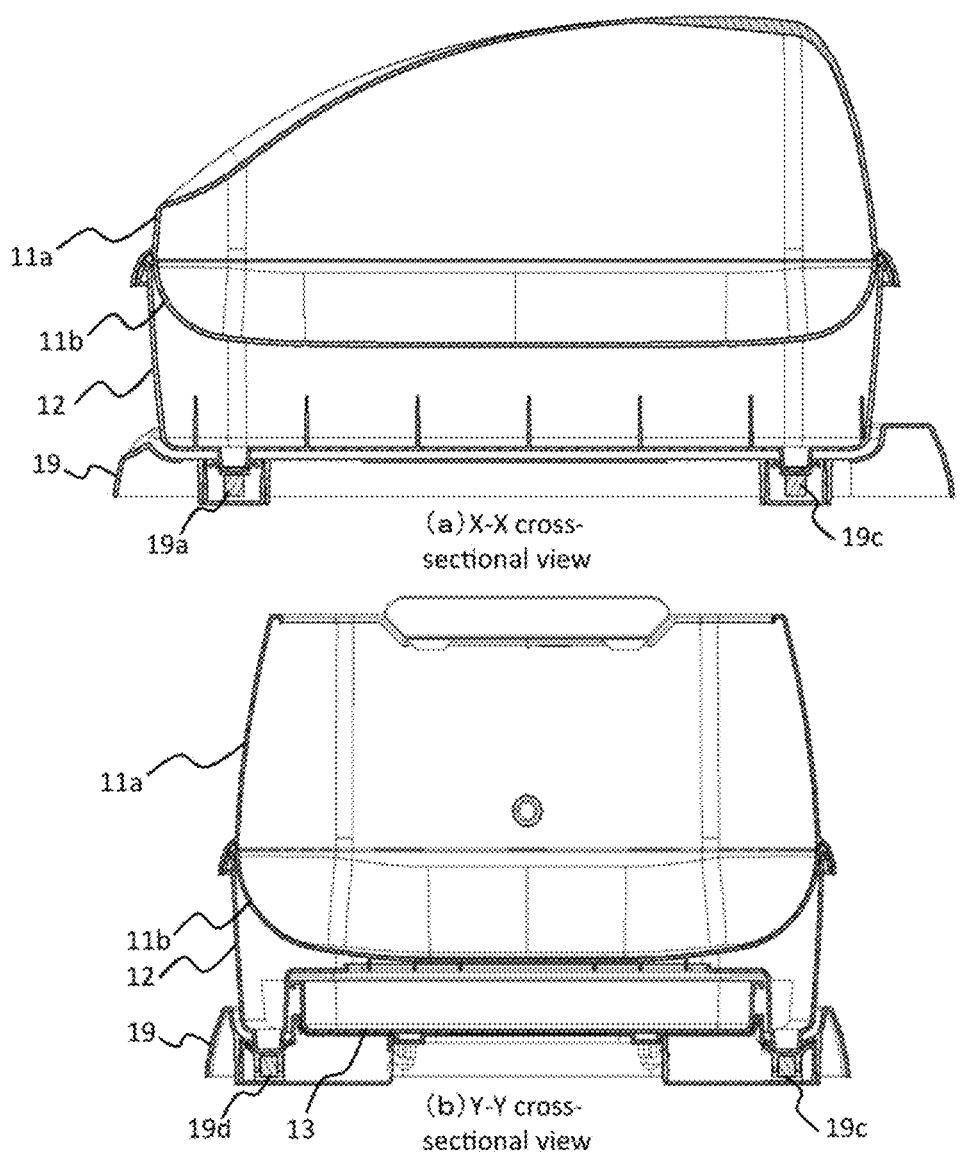
FIG. 4 is a diagram showing an X-X cross-sectional view and a Y-Y cross-sectional view of a cat toilet according to the present embodiment.
Figure 5:
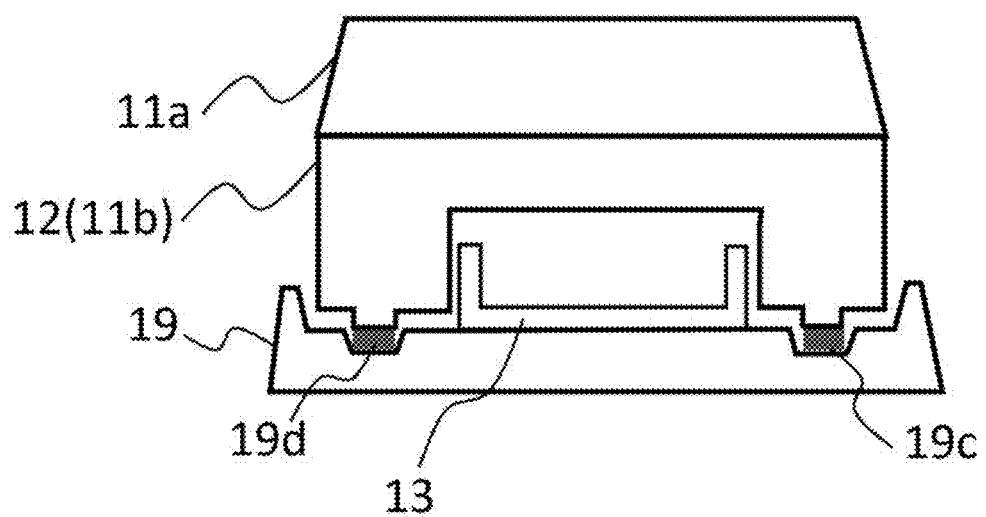
FIG. 5 is a diagram schematically showing a Y-Y cross-sectional view of a cat toilet according to the present embodiment.

FIG. 4 is a cross-sectional view taken along the line X-X and the line Y-Y of the cat toilet according to the present embodiment. FIG. 5 is a diagram schematically showing a Y-Y cross-sectional view of the cat toilet according to the present embodiment.

As can be seen from (a) X-X cross-sectional view and (b) Y-Y cross-sectional view, when the lower toilet container 12 is installed on the sensor plate 19, the bottom protrusion of the lower toilet container 12 is grounded are fitted respectively on the four weight sensors 19*a*~19*d*. At this time, the weight sensor 19*a*~19*d*, the upper case 11*a*, the upper toilet container 11*b*, and the load of the lower toilet container 12 acts only, the load of the urine recovery tray 13 does not act. That is, since the bottom surface of the urine recovery tray 13 is grounded on the base portion 19*e* of the sensor plate 19, while the load of the urine recovery tray 13 is loaded on the sensor plate 19 itself, the weight sensor 19*a*~19*d* it is a structure load is not loaded.

Therefore, when the cat enters the cat toilet 10 (when riding on the upper toilet container 11*b*), the weight sensor 19*a*~19*d*, the upper case 11*a*, upper toilet container 11*b*, and in addition to the lower toilet container 12, the load of the cat (body weight) acts. Thereafter, when the cat performs a urination act on the upper toilet container 11*b*, urine is dropped and absorbed in the pet sheet S of the urine recovery tray 13 passes through the manure separation hole 14 provided in the bottom of the upper toilet container 11*b*. The weight sensor 19*a*~19*d* at this time, the upper layer case 11*a*, upper toilet container 11*b*, and the lower toilet container 12, although the load of the cat weight is acting, as compared with before urination, the load of the amount of urination of the cat is lightened.

(Network Configuration)

Figure 6:
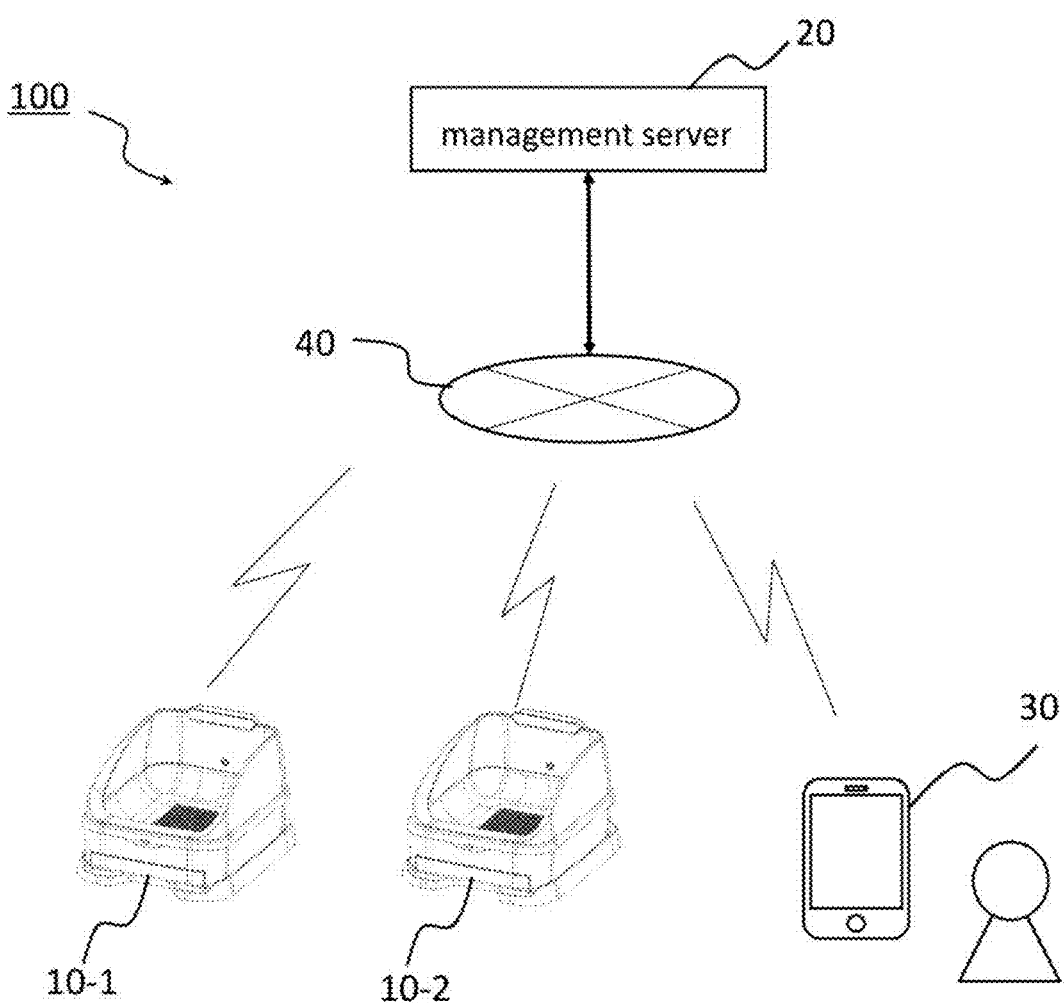
FIG. 6 is a diagram showing a configuration example of a cat toilet usage management system according to the present embodiment.
Figure 7:
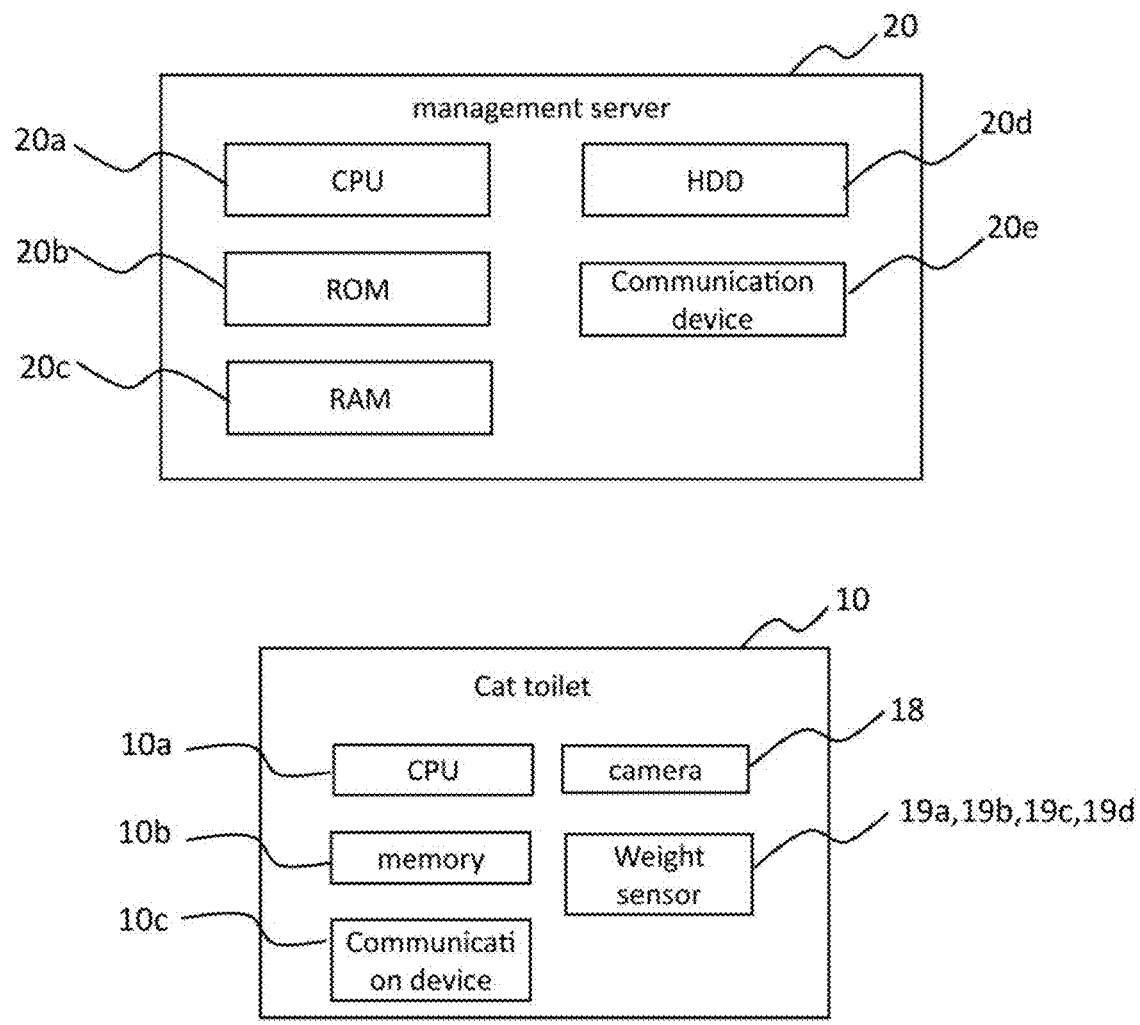
FIG. 7 is a diagram showing an example of a hardware configuration of a management system of a cat toilet and a management server according to the present embodiment.

FIG. 6 is a diagram showing a configuration example of the cat toilet usage management system according to the present embodiment. In FIG. 7, cat toilet usage management system 100 includes the cat toilet 10, a management server 20, and a mobile terminal 30, and they are connected via a network 40.

As described above, the cat toilet 10 according to the present embodiment, in addition to the original function as a cat toilet, has a aspect of IoT device having a camera 18 and a weight sensor 19a~19d, It has the function of managing the usage of the cat toilet (body weight and excretion amount, etc.) of the cat.

The management server 20 is a device that manages the usage status of the cat toilet 10 by the own cats. The management server 20 receives usage information of the cat toilet 10 from the cat toilet 10 via the network 40 and manages the usage information. Also, the management server 20 transmits (notifies) the usage information of the cat toilet 10 to the mobile terminal 30 of the user. The management server 20 may be located on the network 40 that can communicate with the cat toilet 10 and the mobile terminal 30 and may be installed in a data center or the like on the Internet, for example.

The portable terminal 30 is a user terminal for an owner or the like to browse usage information of the cat litter 10 received from the management server 20. For example, a smartphone or a tablet terminal may be used, but it may be any other information processing apparatus including a PC (Personal Computer) or the like.

The network 30 is a communication network including wired and wireless. The network 40 includes, for example, the Internet, a public line network, WiFi (registered trademark), and short-range wireless.

<Hardware Configuration>

FIG. 7 is a diagram showing an example of a management system hardware configuration of the cat toilet and the management server according to the present embodiment.

(Cat Toilet)

The cat toilet 10 includes a central processing unit (CPU) 10a, a memory 10b, a communication device 10c, a camera 18, and weight sensors 19a to 19d.

The CPU 10a is a controller/processor that controls detection devices such as the camera 18 and weight sensors 19a to 19d. In addition, various functional units to be described later are executed and realized by the CPU 10a. The memory 10b is a storage device that stores a control program for the cat toilet 10 and various types of information. The communication device 10c communicates with the management server 20 via the network 40. The CPU 10a, the memory 10b, and the communication device 10c can be built in the cat litter box 10.

The camera 18 is an imaging device that captures an image for recognizing a cat entering the cat toilet 10. The weight sensors 19a to 19d are weighing devices that measure the cat's body weight and excretion amount. The imaging lens of the camera 18 is installed from the back of the cat toilet 10 toward the entrance through the opening provided in the upper case 11a.

(Management Server)

The management server 20 includes a CPU 20a, a ROM (Read Only Memory) 20b, a RAM (Random Access Memory) 20c, an HDD (Hard Disk Drive) 20d, and a communication device 20e.

The CPU 20a executes various kinds of programs and performs arithmetic processing. The ROM 20d stores necessary programs and the like at the time of activation. The RAM 20c is a work area for temporarily storing processing of the CPU 20a and storing data. The HDD 20d stores various data and programs. The communication device 20e communicates with other devices via the network 40.

<Software Configuration>

Figure 8:
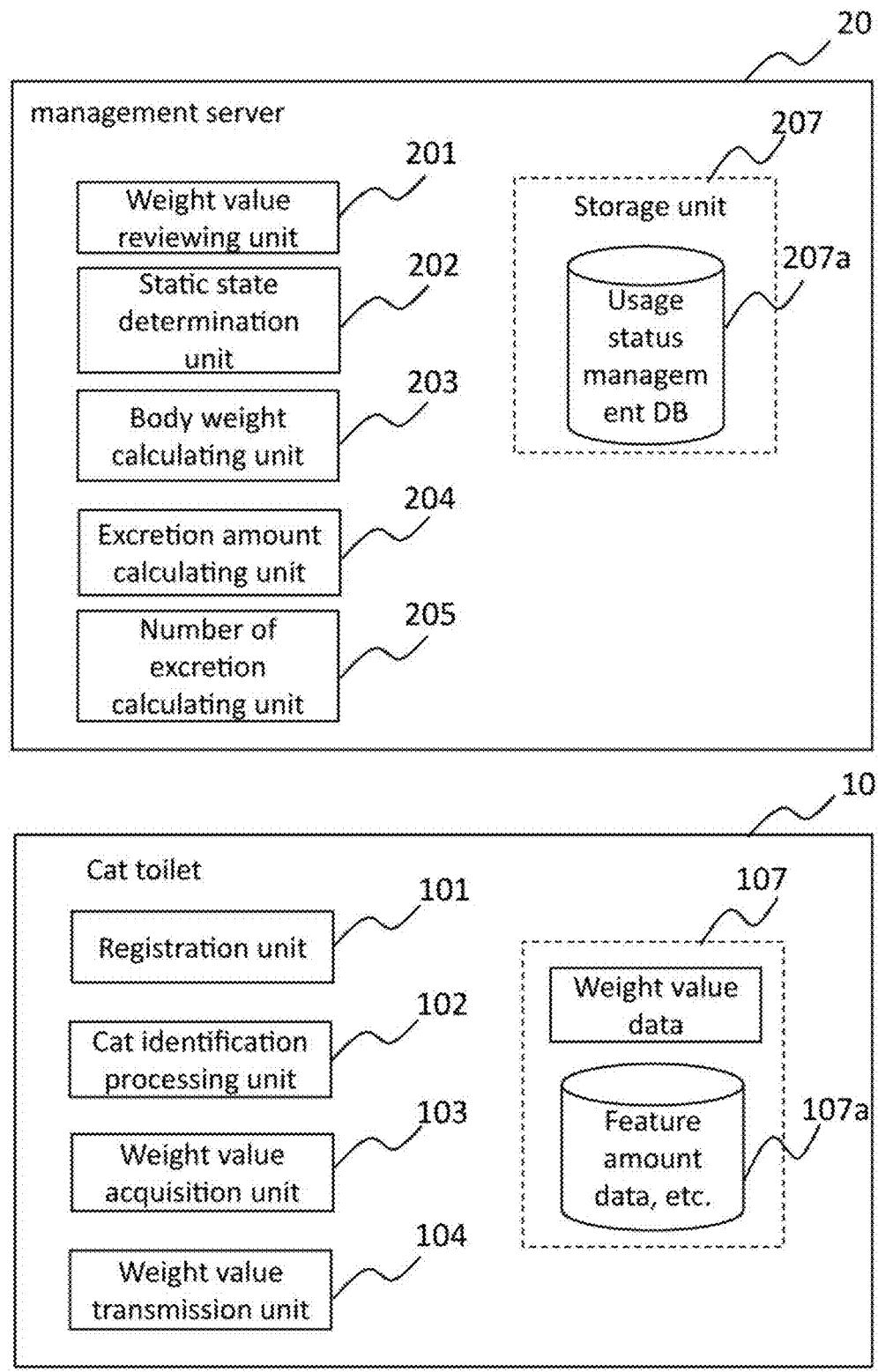
FIG. 8 is a diagram showing a software configuration example of a cat toilet and a management server according to the present embodiment.

FIG. 8 is a diagram showing a software configuration example of the cat toilet and the management server according to the present embodiment.

(Cat Toilet)

The cat toilet 10 includes a registration unit 101, a cat identification processing unit 102, a weight value acquisition unit 103, a weight value transmission unit 104, and a storage unit 107 as main functional units.

The registration unit 101 accepts the registration information of the own cats from the mobile terminal 30 of the user upon the start of the first use of the cat toilet 10. The registration information such as cat IDs, registered cat names, photographic images (face photographs, whole body photographs etc.) is transmitted to the management server 20.

Cat identification processing unit 102, when the cat enters the cat toilet 10, based on the image captured by the camera 18, the identifier of one cat reflected in the image (ex. cat ID) to identify. Incidentally, in the case of one pet rather than multi-head keeping without until identifying the cat that entered the cat toilet 10 for one registered cat (one cat), the execution of the cat identification processing of the cat identification processing unit 102 it is possible to omit.

The weight value acquisition unit 103 starts acquiring weight values (sensing information) from the weight sensors 19a to 19d. The weight value data (weight change data) acquired until the cat leaves the room is stored in the memory 10b by the storage unit 107.

Weight value transmission unit 104, the management server 20, the cat identifier (e.g., cat ID) and transmits the weight value data of the acquired cat. The weight value data is the transition change data of the weight measured until the cat exits from entering the cat toilet 10 (value). The weight value transmission unit 104 transmits a cat identifier (for example, cat ID) and the acquired weight value data of the cat to the management server 20. This weight value data is transitional change data of the weight (value) measured from when the cat enters the cat litter room 10 to when it leaves.

The storage unit 107 sequentially stores the weight values acquired by the weight value acquisition unit 103 in the memory 10b.

The cat DB 106a is a database that stores the cat IDs, the cat images, feature amount data, and the like of the own cats that use the cat toilet 10 for each individual cat. The cat DB 106a is used for cat identification processing which is described later.

(Management Server)

The management server 20 includes a weight value receiving unit 201, a static state determination unit 202, a body weight calculating unit 203, an excretion amount calculating unit 204, a number of excretion calculating unit 205, and a storage unit 207 as main functional units.

The weight value receiving unit 201 receives from the cat toilet 10 a cat identifier (for example, a cat ID) and weight value data (weight transition change data) acquired until the cat exits the room.

The static state determination unit 202 determines a static state time point when the cat that has entered the cat toilet 10 is static state based on the weight value data.

The body weight calculating unit 203 calculates the body weight of the cat based on the weight value data.

The excretion amount calculating unit 204 calculates the excretion amount (urine amount and feces amount) of the cat based on the weight value data.

The number of excretion calculation unit 205 calculates the number of urinations and feces of the cat.

The storage unit 207 updates the calculated body weight, the excretion amount (the urine amount and the feces amount), and the number of excretions (the number of urinations and the number of feces) on the usage state management DB 207a.

The usage status management DB 207a is a database that stores usage information and status of the cat toilet 10 on a cat basis.

Incidentally, each functional unit is intended to be realized by a computer program executed on the hardware resources of the computer constituting the cat toilet 10 or the management server 20. These functional units may be read as "means", "module", "unit", or "circuit".

In addition, the rest determination unit 202, the body weight calculating unit 203, the excretion amount calculating unit 204, the number of excretion calculating unit 205, and the storage unit 207 (usage status management DB 207a) of the management server 20 are all or part of the cat toilet. It may be provided on the 10 side. In this case, the body weight, the amount of excretion, and the like can be calculated on the cat toilet 10 side alone, regardless of whether the management server 10 or the network environment is present.

(Management DB)

FIG. 9 is a diagram showing an example of data of the usage status management DB 207a according to the present embodiment. The usage status management DB 207a is, for example, "user ID", "cat ID", "name", "type", "birth date", "sex", "body weight", "excretion" ("urine amount" and "feces amount"), "number of excretion" ("number of urination" and "number of feces"), and the like.

"User ID" indicates a unique identifier assigned to each user. "Cat ID" indicates a unique identifier assigned to each cat. This is because even one user (one household) can cope with cat cats. "Name" indicates the name of the cat. "Type" indicates the type of cat. "Birth date" indicates the date of birth of the cat. "Sex" indicates the sex of the cat.

The "user ID" and "cat ID" can be automatically issued at the first use or can be arbitrarily pre-registered by the user if unique. The "name", "type", "birth date", "sex", and the like are pre-registered by the user in the first use.

"Body weight" indicates the latest (most recent) weight of the cat. "Urine amount" indicates the urine amount (cumulative value) performed by the cat during the predetermined period. The "feces amount" indicates the feces amount (cumulative value) performed by the cat during a predetermined period. "number of Urination" indicates the number of urination (cumulative value) performed by the cat during the predetermined period. "Number of feces" indicates the number of feces (cumulative value) performed by the cat during a predetermined period.

The "excretion amount" and "the number of urination" are cumulative values in a predetermined period (for example, one day). For this reason, it is reset to 0 every time a predetermined period (for example, one day) elapses. However, past history that has been reset is recorded. In addition, the above data items are merely examples. There may be other data as required. "The unit mg of "excretion amount" can be converted into unit ml by multiplying by a predetermined coefficient. Also referred to as "excretion amount" ("urine amount" and "feces amount") and "number of excretion" ("number of urination" and "number of feces") collectively excretion information.

<Cat Registration Screen at the Start of Use>

Figure 10:
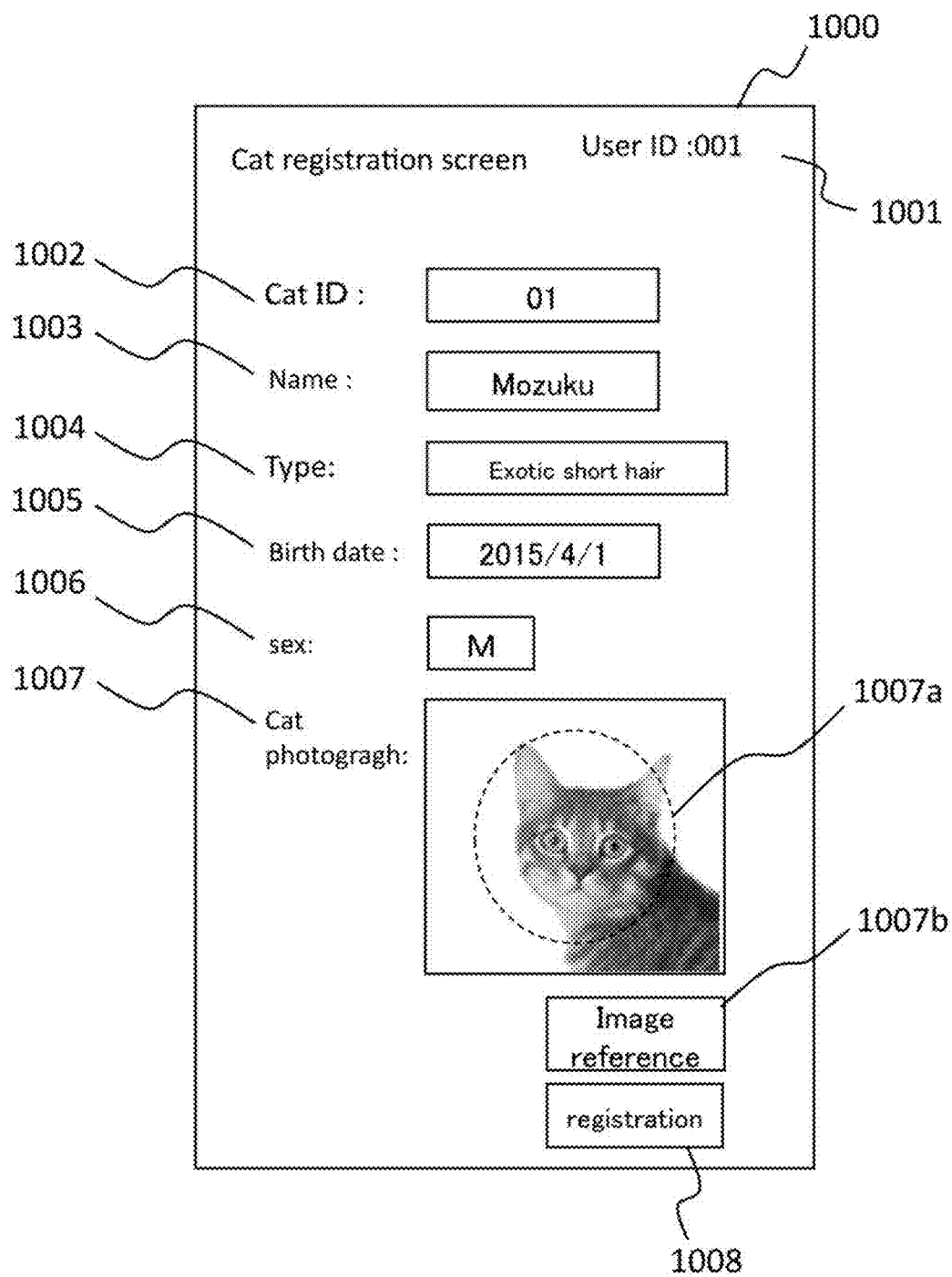
FIG. 10 is a diagram showing an example of a cat registration screen according to the present embodiment.

FIG. 10 is a diagram showing an example of a cat registration screen according to the present embodiment. At the start of use, the user accesses the cat registration screen 1000 of the cat toilet 10 using the portable terminal 30 and the like, inputs necessary information, and registers a domestic cat. In the case of a multi-headed pet, register for all cats. In addition, it is also possible to access the cat toilet 10 from the cat registration screen 1000 of a dedicated application provided in advance as well as the cat registration screen 1000 of the cat toilet 10.

"User ID" 1001 is a column indicating the user ID of the user. "Cat ID" 1002 is a field for inputting a unique identifier to be added for each cat. It may be input by the user arbitrarily, or it may be automatically numbered. "Name" 1003 is a column for the user to input the name of the cat. "Type" 1004 is a column for inputting the type of the cat. "Birth date" 1005 is a field for inputting the date of birth of the cat. "Sex" 1006 is a field for inputting the sex of a cat.

A "cat photograph" 1007 is a column for inputting a photograph of a cat to be used for cat identification processing (cat recognition). Using the camera of the mobile terminal 30, the user photographs and inputs a cat image in accordance with the guide line 1007a so that the face of the cat comes to the center, or uploads an existing cat image from "image reference" 1007b. In addition to facial images, cat images (posterior, standing, sitting posture, urination posture, etc.) of a plurality of parts may be input for improving accuracy.

"Registration" 1008 is a registration button of entered registration information. When "registration" 1008 is pressed by the user, the input registration information is transmitted from the portable terminal 30 to the cat toilet 10.

The toilet 10 for cats extracts a feature amount from the cat image from the registration information received from the mobile terminal 30 and stores it in the cat DB 107a in association with the feature amount and the cat ID of the cat. Also, the registration information is further transmitted from cat litter 10 to the management server 20. The registration information may be transmitted from the portable terminal 30 to the management server 20 via the network 40 and may be transmitted from the management server 20 to the cat toilet 10. Also, the registration information is only an example. Other information may be registered as necessary.

Information Processing>

Information processing of the cat toilet usage status management system 100 according to the present embodiment will be described.

(Cat Toilet)

Figure 11:
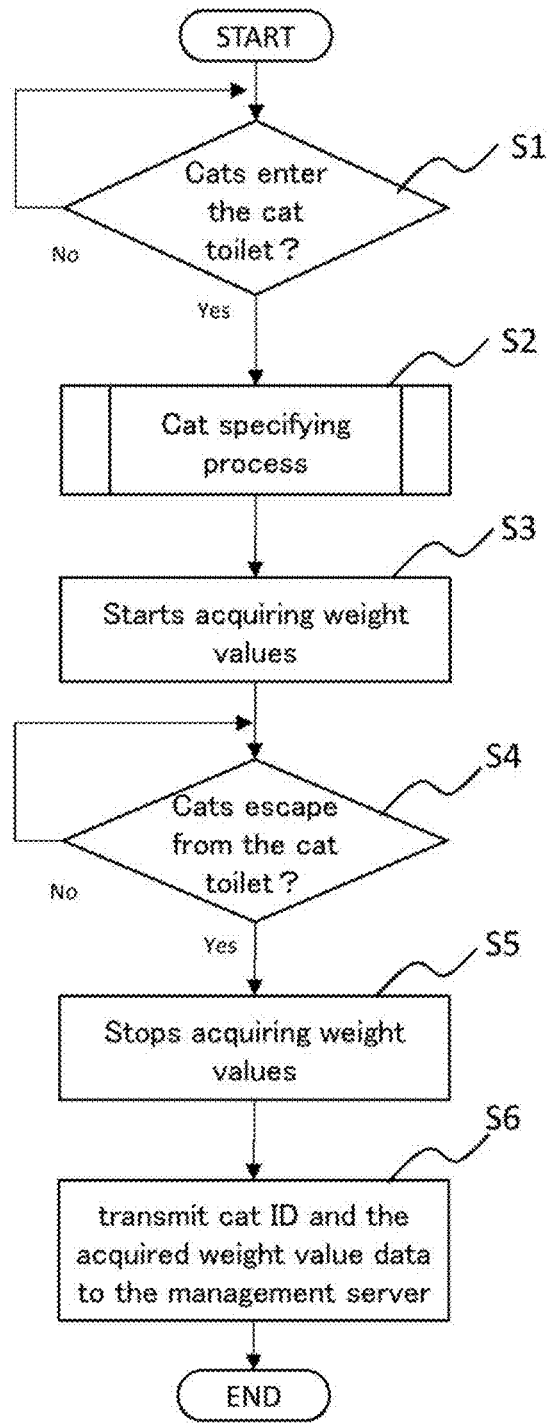
FIG. 11 is a flowchart showing information processing executed by a cat toilet according to the present embodiment.

FIG. 11 is a flowchart showing information processing executed by the cat toilet according to the present embodiment.

S1: The cat identification processing unit 102 determines whether or not the cat has entered (entered) the cat toilet 10. As a determination method, when the cat identification processing unit 102 recognizes the image of the cat in the image captured by the camera 18, it can be determined that the cat has entered the cat toilet 10. Further, when the weight value (weight value) is detected by the weight sensors 19a to 19d, it can be determined that the cat has entered the cat toilet 10. It is noted that when the cat is image-recognized and the weight value is detected, it may be determined that the cat has entered the cat toilet 10. Thereby, for example, it is possible to prevent erroneous detection such as detecting when the owner changes sand as entering the room.

S2: When a cat enters the cat toilet 10, the cat identification processing unit 102, based on a plurality of images captured by the camera 18, identifies an identifier of one cat (for example, A cat specifying process for specifying (cat ID) is executed. By specifying the cat ID of a cat that has entered a room among a plurality of domestic cats, it is possible to deal with multiple cats. In particular, in this embodiment, since the camera 18 images from the opening of the upper layer case 11a, the camera 18 is positioned at the height of the cat and at the front position as compared to imaging from the upper case 11a higher than the height of the cat. The imaging lens can be arranged. For this reason, since it is easy to take an image including a cat's face and body pattern, it is suitable for extracting a feature point of a cat from the image.

In the case of cats with multiple heads, it is necessary to identify which cats the cats in the cat toilet 10 are multiheaded. As a general method for identifying a cat, for example, there is a method for identifying a cat by attaching a collar equipped with an RFID (radio frequency identifier) tag or a Bluetooth (registered trademark) tag to the cat. However, some cats dislike the collar, so forcing the collar may forcibly cause stress and eventually cause illness. For this reason, in the cat identification processing according to the present embodiment, when a cat enters the cat toilet 10, the cat is individually identified from the cat image of the camera 18, so that the cat toilet is not stressed. A cat in 10 is accurately identified.

As described above, the cat identification processing unit 102 extracts the feature amount of the image from the cat image from the registration information of the domestic cat input at the start of the first use of the cat litter 10, and the feature amount and the cat ID of the cat. in association with you are saved in the cat DB 107a. It should be noted that more feature amount are automatically extracted from cat image data captured and accumulated after the start of operation, and the features of the cat are deeply learned (deep learning model).

When a cat enters the cat toilet 10 after the use of the cat toilet 10 is started, a cat image of the cat entering the room is captured by the camera 18. Since one cat image cannot always capture a highly accurate front face image, the camera 18 captures a plurality of cat images of a predetermined number or more. It is noted that even if images are captured continuously, the same/homogeneous cat images may be captured. By capturing cat images for a predetermined time or more or at predetermined time intervals, a variety of orientations such as multiple directions and multiple postures can be obtained. A plurality of cat images can be taken.

The cat identification processing unit 102 selects an appropriate cat image having a good image quality for use in the cat identification process from among a large number of captured cat images. As selection criteria, for example, it is possible to select a cat image with small blurring or blurring by calculating the blurring or blurring amount of the subject, selecting a cat image in which the cat's face is detected by performing cat face detection processing. It is noted that it is assumed that a plurality of appropriate cat images is selected instead of only one.

The cat identification processing unit 102 extracts each feature amount from the selected cat image. Then, the extracted feature amount is compared with each feature amount of the cat image stored in the cat DB 107a, and the cat ID corresponding to the cat image having a high degree of matching of the feature amount is obtained from the cat DB 107a. The cat that has entered the toilet 10 is uniquely identified by the cat ID. Returning again to FIG. 11.

S3: The weight value acquisition unit 103 starts acquiring weight values (sensing information) from the weight sensors 19a to 19d. The acquired weight value is stored in the memory 10b by the storage unit 107.

S4: The cat identification processing unit 102 determines whether or not the cat has left (exited) the cat toilet 10. As a determination method, the cat identification processing unit 102 can determine that the cat has entered the cat toilet 10 when the cat is no longer recognized in the image captured by the camera 18. Further, when the weight value is no longer detected by the weight sensors 19a to 19d, it can be determined that the cat has left the cat litter box 10.

S5: The weight value acquisition unit 103 stops acquiring weight values (sensing information) from the weight sensors 19a to 19d.

S6: The weight value transmission unit 104 transmits the cat identifier (for example, cat ID) and the acquired weight value data (total weight value stored in the memory 10b) to the management server 20. This weight value data is transitional change data of the weight (value) measured from when the cat enters the cat litter room 10 to when it leaves.

When a plurality of weight sensors is provided, such as the weight sensors 19a to 19d, the weight value from each is acquired and each weight value data is transmitted to the management server 20.

(Management Server)

Figure 12:
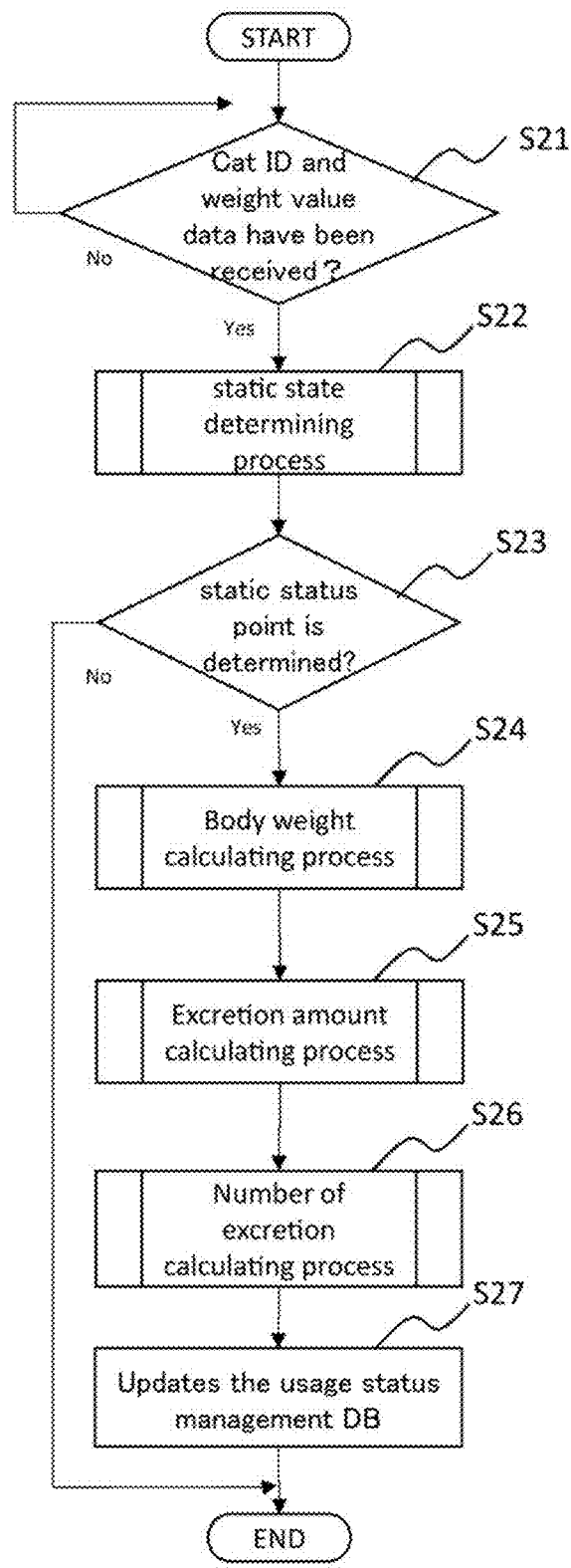
FIG. 12 is a flowchart showing information processing executed by the management server according to the present embodiment.

FIG. 12 is a flowchart showing information processing executed by the management server according to the present embodiment.

S21: The weight value receiving unit 201 determines whether or not a cat identifier (for example, cat ID) and weight value data have been received from the cat toilet 10.

S22: The static state determination unit 202 executes a static state determination process based on the weight value data. The static state determination process is a process of determining a static state time point (static state point) at which the cat is static state from the transition change (waveform) of the measured weight value. Details will be described later.

S23: The process branches depending on whether or not a static state time point (static point) is determined from the weight value data. If it is determined that there is a static state time, the process proceeds to S24. If it is not determined that there is a static state time point, it is considered that the cat has not been excreted, and the process proceeds to END. This is because the cat takes a static state for a certain number of seconds (for example, 10 seconds) or more during excretion including urination and feces. In detail, it demonstrates based on the example of a pattern of the amount transition change mentioned later.

S24: The body weight calculating unit 203 executes body weight calculating processing based on the weight value data. The body weight calculating process is a process of calculating the body weight of the cat from the weight value data. In detail, it demonstrates based on the example of a pattern of the amount transition change mentioned later.

S25: The excretion amount calculating unit 204 executes excretion amount calculating processing based on the weight value data. The excretion amount calculating process is a process for calculating the excretion amount of the cat (the urine amount and the feces amount) from the weight value data. In detail, it demonstrates based on the example of a pattern of the amount transition change mentioned later.

S26: The number of excretion calculating unit 205 calculates (counts) the number of urinations and the number of feces. Specifically, when the urine amount of the cat is calculated in S25, the number of urination can be calculated as 1, and when the urine amount of the cat is calculated, the number of urination can be calculated as 1.

S27: The storage unit 207 updates the usage status management DB 207a. Specifically, calculated in S24 "amount of body weight (body weight)", "excretion amount" calculated in S25 ("urine amount" and "feces amount"), and was calculated in S26 "number of excretion" ("number of urination" and "number of feces") is updated on the usage status management DB 207a (FIG. 9). When the usage status management DB 207a is, for example, a cumulative value management every day, the values before update of "body weight", "excretion amount", "feces amount", "number of urination", and "number of feces" is added to the calculated value.

<Pattern of Change in Weight Transition>

Here, the weight value data will be described with some patterns. As described above, the weight value data indicates changes in the weight (value) measured by the weight sensors 19a to 19d from when the cat enters the cat litter room 10 to when the cat leaves.

Figure 13:
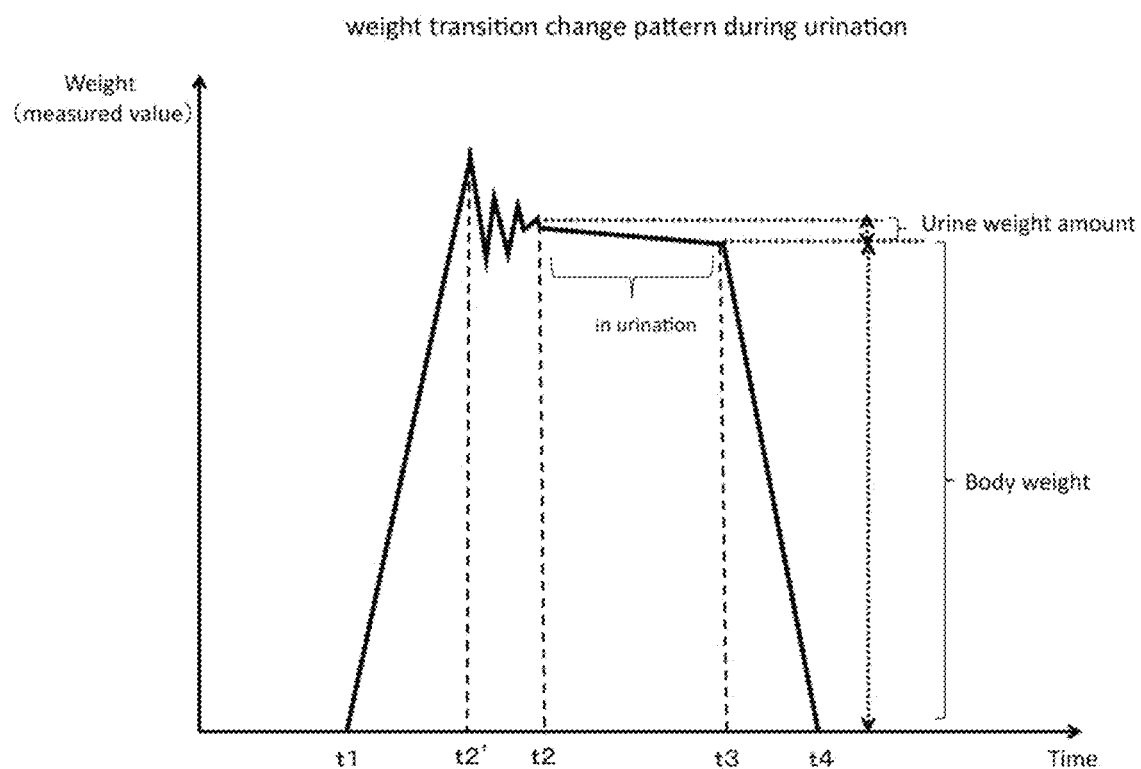
FIG. 13 shows an example of a weight transition change pattern during urination according to the present embodiment.
Figure 14:
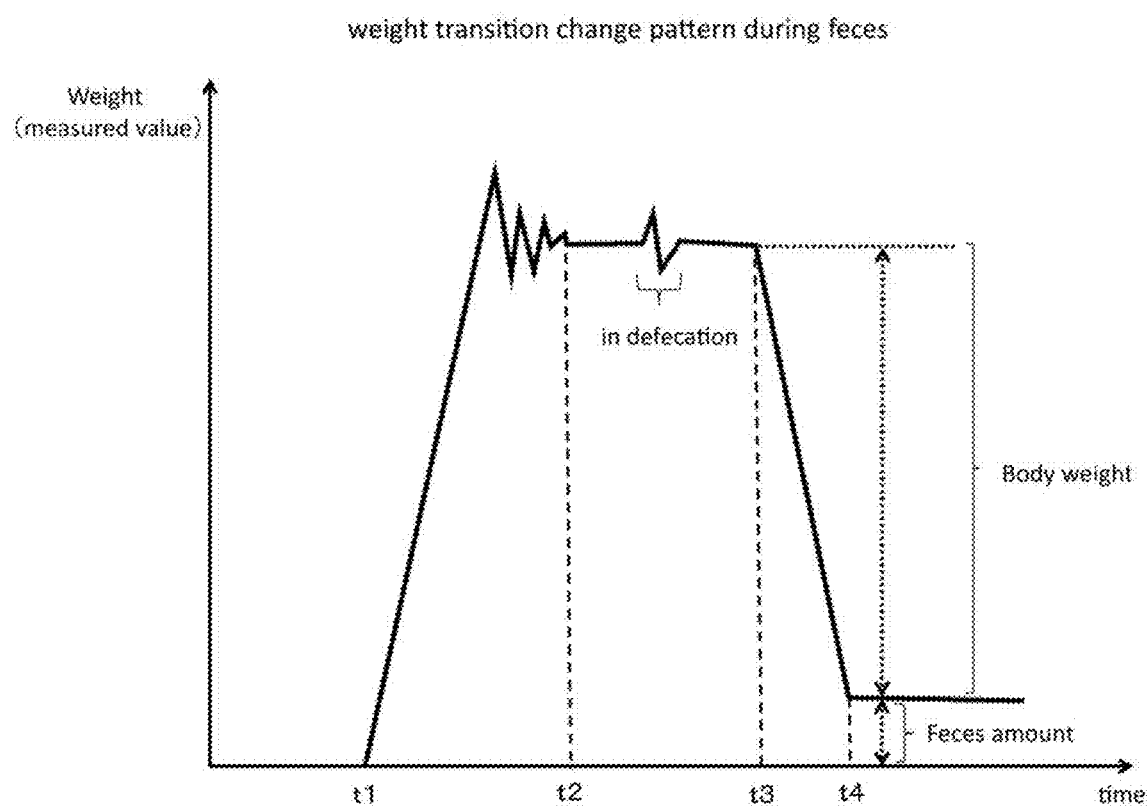
FIG. 14 shows an example of a weight transition change pattern during feces according to the present embodiment.
Figure 15:
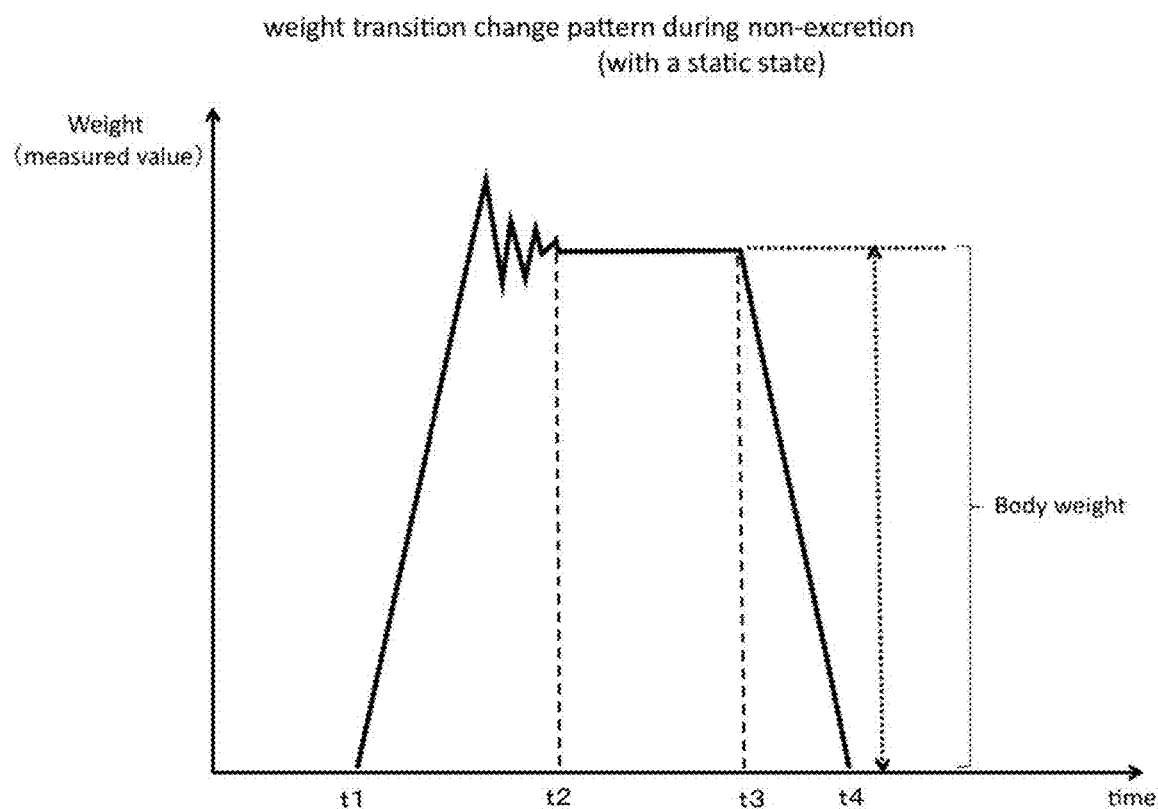
FIG. 15 shows an example of a weight transition change pattern during non-excretion according to the present embodiment (with a static state).
Figure 16:
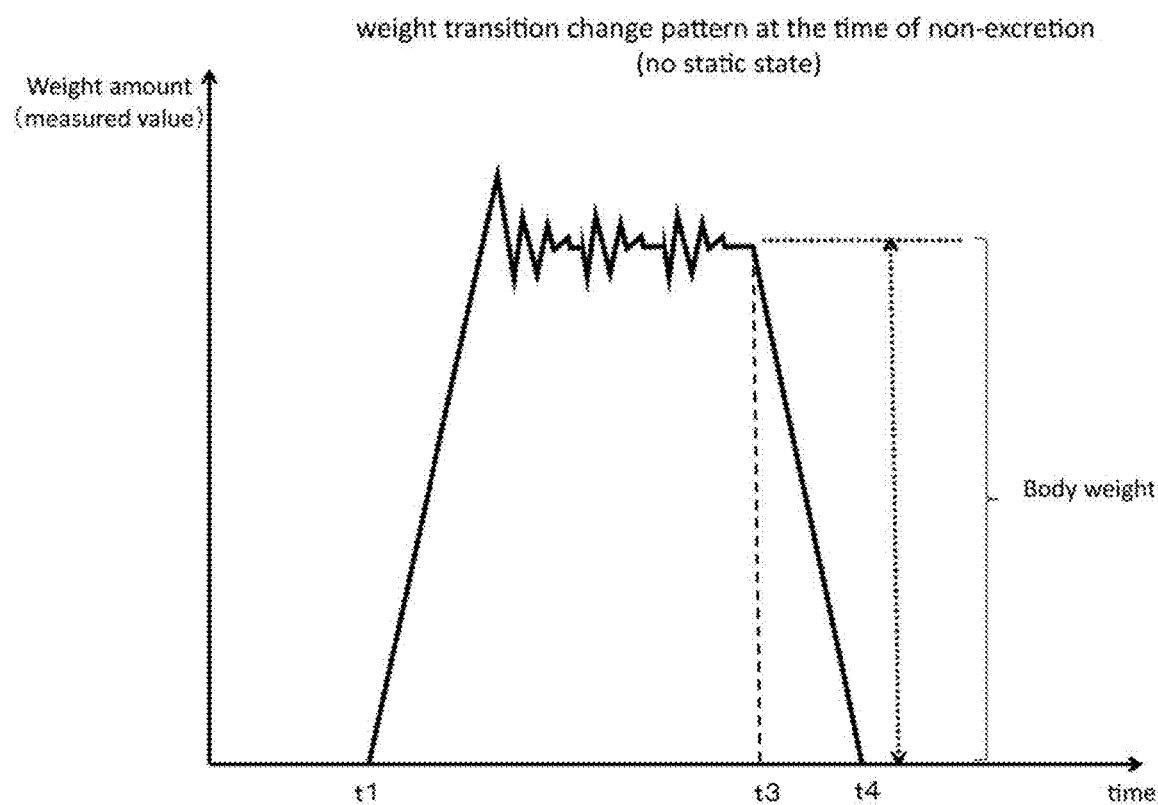
FIG. 16 shows an example of a weight transition change pattern at the time of non-excretion according to the present embodiment (no static state).

FIG. 13 shows an example of a weight transition change pattern during urination according to this embodiment. FIG. 14 shows an example of a weight transition change pattern during feces according to the present embodiment. FIG. 15 shows an example of a weight transition change pattern during non-excretion according to the present embodiment (with a static state). FIG. 16 shows an example of a weight transition change pattern at the time of non-excretion according to the present embodiment (no static state). Moreover, in the weight transition change pattern graph in each figure, a vertical axis | shaft shows a weight (measurement value) and a horizontal axis shows time. Times t1 to t4 indicate the following time points, respectively.

Entry start time t1: Indicates the time when the cat starts entering the cat toilet 10. Since the weight of the cat is loaded, the weight (measured value) increases at a stretch. It is noted that the weight at the entry start time t1 (and before that) is the total weight of the upper layer case 11a, the upper layer toilet container 11b, and the lower layer toilet container 12. However, in FIGS. 13 to 16, these weighted states are shown as zero.

Completion of entry (at the start of static state) t2: Indicates the point in time when the cat has entered the cat toilet 10. Immediately after the cat enters the room, t2' has a large movement of weight (measurement blur) because the cat is operating greatly, and the weight value at this time is low in accuracy. For this reason, a point in time after the cat enters the room that the movement of the cat becomes gentle and the weight swing becomes a certain level or less (referred to as a static state start point or a static state start point) is defined as a substantial entry completion point.

Between the static state t2 and the longest t3: The cat takes a static state longer than a certain number of seconds (for example, 10 seconds on the rule of thumb) during excretion including urination and feces. However, even when excretion is not performed, it may take a static state for about 5 seconds.

Exit start time t3: Indicates the time when the cat started to leave the cat toilet 10. Since it is released from the weight of the cat, the weight (measured value) drops at a stretch.

Exit completed time t4: Indicates the time when the cat has exited the cat toilet 10.

(Static State Determining)

This is a process of determining a time range in which the cat is in a static state after the entry start time t1. Determining evaluation is performed for all time points from the entry start time t1 to the exit completed time t4.

As the determining evaluation, for example, it is checked whether the difference weight value between the reference time point a to be determined and the next time point b is within a range of plus or minus x. Next, it is checked whether the difference weight value between the time point b and the next time point c is within the range of plus or minus x. Then, the time point range in which the differential weight value at the next time point is continuously within the range of plus or minus x is acquired, and the time point range of the longest range among the acquired time point ranges is determined to be static state. Further, it can be determined that the camera is static state even when the difference between the plurality of images captured by the camera 18 becomes equal to or less than a certain level. Moreover, you may determine combining these 2 or more.

Further, for example, it is determined how many points ahead from the reference time point a to be determined is within the range of plus or minus x. The longest range of time points can be determined as a static state. If the value of x is too large, it can be determined that the object is still but not yet static state, and if it is too small, it cannot be determined that the object is static state. For this reason, the value of x is appropriately between plus and minus 1% to 15%, more preferably between plus and minus 2% and 8%.

(Calculating of Body Weight and Excretion Amount)

In the example of the weight transition change pattern during urination in FIG. 13, the weight gradually decreases as time elapses from the time when the entry is completed at t2 (statin state start time) to the time when the exit starts at the longest t3. This indicates that the cat is urinating during this time. When a cat entering the cat toilet 10 urinates on the upper toilet container 11b, the urine passes through the manure separation hole 14 provided at the bottom of the upper toilet container 11b, falls into the pet sheets on the urine collection tray 13 and is absorbed. At this time, the weight sensors 19a to 19d are loaded with the upper layer case 11a, the upper layer toilet container 11b, the lower layer toilet container 12, and the weight of the cat and does not act on the weight sensors 19a to 19d. For this reason, compared with before urination, the total load acting on the weight sensors 19a to 19d is reduced by the amount of urine dropped on the pet sheet S of the urine collection tray 13 (FIG. 5).

Therefore, the excretion amount calculating unit 204 in the weight transition change pattern of the weight value data, The weight decreases little by little as time elapses between t2 and the longest t3.

The weight of t3 is less than the weight of t2,

When the above feature appears, the reduced differential weight ("weight of t2"–"weight of t3") is calculated as "urine amount".

In addition, the body weight calculating unit 203 can calculate the difference weight between the weight of t3 and the weight of t4 ("weight of t3"–"weight of t4") as "body weight". Thus, by calculating the weight amount of urine and feces using the differential weight, even if the previous urine and feces remain in the tray, the weight of the current urine and feces can be calculated correctly.

Next, in the example of the weight transition change pattern during feces in FIG. 14, although the weight does not change from the time when t2 is completed (stationary start time) to the time when the longest t3 exits, feces dropped during that time. A comparatively large swing width (measurement blur accompanying cat defecation) is measured by impact. This indicates that the cat is doing feces during this time. Therefore, when the measurement is stopped again after a pulse-like measurement blur occurs during the static state determining, the static state determining is continued.

In addition, the weight at the exit completed time at t4 is larger than the weight at the time of entering the room at t1. This means that when the cat performs a feces action on the upper-layer toilet container 11b, the feces do not pass through the manure separation hole 14 provided at the bottom of the upper-layer toilet container 11b. For this reason, at the exit completed time at t4, the total load of the upper case 11a, the upper toilet container 11b, the lower toilet container 12, and the feces amount acts on the weight sensors 19a to 19d (FIG. 5)

Therefore, the excretion amount calculating unit 204 in the weight transition change pattern of the weight value data,
  A relatively large runout is measured between t2 and the longest t3.
  The weight of t4 is greater than the weight of t1,
  when the above feature appears, the increased differential weight ("weight of t4"–"weight of t1") can be calculated as "feces amount".
  In addition, the body weight calculating unit 203 can calculate the difference weight between the weight of t3 and the weight of t4 ("weight of t3"–"weight of t4") as "body weight".
  In addition, in the case where FIG. 13 and FIG. 14 are combined, that is, when the cat performs urination and feces in one entry/exit,
  The weight decreases little by little as time elapses between t2 and the longest t3.
  The weight of t3 is less than the weight of t2,
  A relatively large runout is measured between t2 and the longest t3.
  The weight of t4 is greater than the weight of t1,
  The feature appears. In this case, the excretion amount calculating unit 204 calculates the difference weight ("weight of t2"–"weight of t3") as "urine amount" and calculates the difference weight ("weight of t4"–"weight of t1") and it can be calculated as "feces amount". It is noted that there is also a difference that the weight of t2 and the weight of t3 are the same when only the feces act is performed.

Next, the example of the weight transition change pattern at the time of non-excretion of FIG. 15 is referred. That is, if the weight transition change pattern example in FIGS. 13 and 14 is not applied, the animal is not excreted even if there is a static state. Although the domestic cat entered the toilet 10 for a cat, for example, an action such as a cat's appearance was seen, but an actual excretion act (urination and feces act) was not achieved. However, since the body weight can be calculated, the body weight calculating unit 203 calculates the difference weight between the weight at t3 and the weight at t4 as "body weight".

Next, reference is made to an example of a weight transition change pattern during non-excretion in FIG. 16. If there is no static state, there is no excretion of the animal. This is because cats remain static state for a certain number of seconds during excretion act, including urination and feces act. Since the body weight can be calculated, the body weight calculating unit 203 calculates the difference weight between the weight at t3 and the weight at t4 as "body weight". However, since the case of FIG. 16 does not have a static state, the calculated "body weight" may have a large error from the correct "body weight" due to the measurement blur of the weight measured at t3. For this reason, the body weight calculating unit 203 may not calculate the "body weight" when there is no static state.

Figure 17:
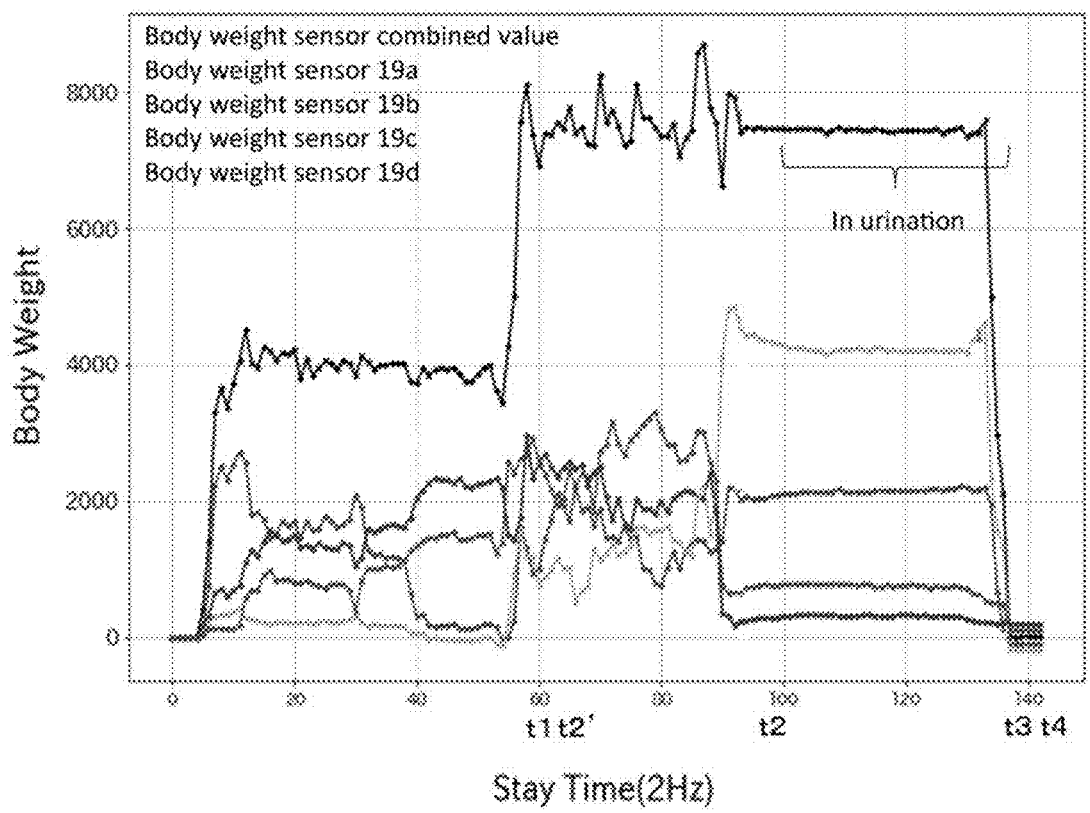
FIG. 17 shows a weight transition change pattern (actual measurement value) during urination according to the present embodiment.

FIG. 17 shows a weight transition change pattern (actually measured value) during urination according to the present embodiment. The weight change pattern graphs in the above figures are only schematically shown, and the actual values of changes in weight actually measured by the weight sensors 19a to 19d are smooth solid lines as shown in the figure. Instead, the change in weight has a runout width (measurement blur) measured as the cat moves in the cat litter box 10. This is due to vibrations associated with the movement of the cat in the cat litter 10 and sanding (from t2' (around 60) to t2 (around 95) on the horizontal axis), and the composite value greatly fluctuates between about 7000 and 9000. After that, when the cat stops moving for excretion and becomes static state (from t2 (around 95) to t3 (around 130) on the horizontal axis), it can be seen that the vibration is almost gone. Along with urination, a gradual weight loss of, for example, about 50 mg per second has also been observed (from t2 (around 95) to t3 (around 130) on the horizontal axis).

In addition, since the cat toilet 10 according to the present embodiment includes four sensors of the same type, that is, the weight sensors 19a to 19d, the weight value data from each of the four sensors is summed (synthesized), so that the entire cat toilet is obtained. It is possible to generate a transition change of one weight (value). Further, the one weight (value) may be an average value, a median value, or an approximate curve value of neighboring measurement values actually measured by the plurality of weight sensors 19a to 19d.

Further, the weight sensors 19a to 19d according to the present embodiment are required to have a detection function per unit time or more and are required to be detected at least once per second. On the other hand, even if the number of detections is increased more than once per 0.1 second, the detection accuracy does not improve as the amount of detection data increases, but rather a slight vibration is detected more than necessary. Therefore, the time resolution of the detection function should be once every 0.3 to 0.6 seconds. In the present embodiment, the weight detection is performed once every 0.5 seconds. Therefore, one scale unit on the horizontal axis in FIG. 17 is 0.5 seconds. In the case of the invention described in Patent Document 1, since the weight is detected after the cat's excretion is finished, the detection function per unit time of the weight sensor may not be so high.

(Supplement)
  It is possible to further determine whether or not each differential weight is an appropriate value as "body weight", "urine amount", and "feces amount". For example, the upper limit value and the lower limit value that are appropriate based on the standard "body weight" of the cat, the cat breed, or the cat in general registered in advance are determined in advance, and the differential weight is the upper limit value and the lower limit value. When it is within the range, the difference weight is calculated as "body weight". On the other hand, when it is out of the range, the differential weight is regarded as a measurement blur accompanying the cat motion and is not calculated as "body weight". In addition, the upper limit value and the lower limit value that are appropriate based on the standard "urine amount" and "feces amount" of the cat, the cat breed, or the cat in general registered in advance are determined in advance, and the differential weight is when the difference is within the range between the upper limit value and the lower limit value, the differential weight is calculated as "urine amount" and "feces amount". On the other hand, when it is out of the range, the reduced differential weight is regarded as a measurement blur accompanying the cat motion and is not calculated as "urine amount" and "feces amount". Thereby, the calculation accuracy of the "body weight", "urine amount", and "feces amount" by the body weight calculating unit 203 and the excretion amount calculating unit 204 can be further improved. However, even in this case, when the weight difference between t2 to t3 and the weight difference between t1 and t4 shown in FIG. 13.

Cats should remain static state for a certain number of seconds (for example, 10 seconds as a rule of thumb) during excretion act, including urination and feces. However, even when excretion act is not performed, it may take a static state for about 5 seconds. For this reason, when the number of continuous seconds from the static state t2 is not equal to or greater than a threshold number of seconds (for example, 8 seconds), the differential weight is not calculated as "urine amount" and "feces amount". Does not count number of excretion. Thereby, the calculation accuracy of the "body weight", "urine amount", and "feces amount" by the body weight calculating unit 203 and the excretion amount calculating unit 204 can be further improved.

The presence or absence of feces may be confirmed by an image of the camera 18. After the cat exits, the presence or absence of feces can be determined by discriminating the color of cat sand and the color of feces in the image. Here, since the camera 18 is imaging through the opening of the upper case 11a, an image of feces can be captured from a position lower than the conventional one. For even urination, and the presence or absence of water droplets from manure separation hole 14, the color change of the sheet S, it is possible to determine the presence or absence of urination.

Noise often rides on the weight value data (raw data) acquired by the cat toilet 10 from the weight sensor. As in the conventional example (for example, Patent Document 1), there are two weighing scales, namely, a first weighing scale that measures the weight of the excrement receptacle and a second weighing scale that measures the weight of the measuring table on which the animal is placed. When (two types) of weighing scales are used, the first weight and the second weighing scale are weighing scales having different sensing degrees and sensing accuracy. That is, since the first weighing scale measures excrement and the weighing order is set to the mg unit level, the second weighing scale measures the body weight, and the weighing order is set to the g or kg level. Therefore, since the former has a higher degree of sensing and higher accuracy than the latter, the fluctuation width (measurement blur) is large and frequently occurs when the weight changes. Since the same type of weight sensors 19a to 19d according to the present embodiment measures and calculates body weight and excretion amount with one sensor (one type of sensor 0), the former is a type of sensor with a high degree of sensing and sensing accuracy.

The management server 20 can execute a predetermined noise filtering process on the measurement data used before executing the body weight calculation process and the excretion amount calculation process. In the cat litter 10 according to the present embodiment, one weight sensor 19a to 19d is provided at each of the outer corners of the sensor plate 19 (FIG. 3). Using this feature, if the weight value suddenly changes greatly at a certain point in time, it can be determined whether it is noise by checking whether the changing occurs in only one sensor or all four sensors. For example, in the weight value data (actual measurement value) as shown in FIG. 16, when only one sensor has a large value, the large weight value at this time is determined as noise, and the weight value at this time point can be corrected by being leveled based on the weight value at the time points before and after this time point. Thereby, the calculation accuracy of the "body weight", "urine amount", and "feces amount" by the body weight calculating unit 203 and the excretion amount calculating unit 204 can be further improved.

SUMMARY

As described above, the cat litter 10 according to the present embodiment includes one (one type) weight sensor for measuring the cat's body weight and urine amount and no weight sensor for measuring the load of urine recovery tray 13. As a result, it is possible to simplify the toilet 10 for cats and reduce the cost.

Further, on the structure of the cat toilet 10, although the upper case 11a, the upper toilet container 11b, the lower toilet container 12, and the load of the cat weight is configured to act on the weight sensor, the load of the urine recovery tray 13 is configured not to act on the weight sensor. Under such a structure, based on the weight transition change of the load measured by the weight sensor of one (one), it is possible to accurately measure the body weight and urine amount of the cat at the same time, respectively.

That is, it is possible to provide an animal toilet or the like that accurately measures an animal's body weight and excretion using one (or one) scale.

It is to be noted that, although the present invention has been described with reference to specific embodiments according to preferred embodiments of the present invention, it is to be understood that these embodiments may be modified without departing from the broader spirit and scope of the invention as defined in the appended claims. It is obvious that various modifications and changes can be made to the examples. In other words, the present invention should not be construed as being limited by the details of the specific examples and the accompanying drawings.

Moreover, this invention is not restricted only to a cat, for example, it can apply also to other animals and pets (dog etc.).

In addition, in the toilet usage status management system 100 for cats according to the present embodiment, from the viewpoint of early detection of cat diseases, when an abnormality is seen in body weight, excretion amount, number of excretions, etc., from the management server 20 alternatively, it is also possible to notify the portable terminal 30 of the owner or a veterinarian of information such as usage information on the cat litter 10 and alerts for calling attention.

DESCRIPTION OF REFERENCE SYMBOLS

10 Cat toilet
20 Management server
30 Mobile terminal
40 network
100 toilet usage management system for cats 101 Registration Unit
102 Cat identification processing unit
103 Weight value acquisition unit
104 Weight value transmission unit
107 storage unit
201 Weight value reviewing unit
202 Static state determination unit
203 Body weight calculating unit
204 Excretion amount calculating unit
205 Number of excretion calculating unit
207 storage unit

The invention claimed is:

1. An animal toilet usage management system for cats, the toilet usage management system including an animal toilet for cats and a management server, wherein
the animal toilet for cats includes;
an upper container whose bottom part has holes formed therein, the holes penetrating the bottom part in a vertical direction,
a lower container configured to receive urine passing through the holes, and
four first weight sensors configured to measure weight of the upper container, the four first weight sensors configured to be not loaded with the urine received by the lower container after passing through the holes,
the management server includes;
a calculating part configured to calculate, based on a change in weight of a combined value of weight measurements measured by the four first weight sensors, a urine amount of an animal, without any second weight sensor configured to measure weight of the lower container, wherein
the combined value of weight measurements is configured to include a variation range due to a sand scratching act of a cat in the animal toilet, and the combined value is configured to be leveled based on the weight measurements measured at a timing before a certain timing included in a duration of the sand scratching act and the weight measurements measured at a timing after the certain timing, when the weight measurements measured at the certain timing has the variation range which is greater than those measured at the timing before the certain timing and measured at the timing after the certain timing, and the corresponding variation range measured at the certain timing occurs in the weight measurement of only one of the four first weight sensors.

2. The animal toilet usage management system for cats claimed in claim 1, wherein the management server further includes a static state determining part configured to detect, based on the change in weight of the combined value of the upper container, a static state of the animal which has entered the upper container.

3. The animal toilet usage management system for cats claimed in claim 2, wherein, in a case where the static state is detected, the calculating part is configured to calculate decreased weight as the urine amount, if the weight decreases from a static state start time when the static state starts to an exit start time when the animal starts to exit the upper container.

4. The animal toilet usage management system for cats claimed in claim 2, wherein, in a case where the static state is detected, the calculating part is configured to calculate increased weight as a feces amount, if the weight increases from an entrance start time when the animal starts to enter the upper container to an exit completed time when the animal completes exiting the upper container.

5. The animal toilet usage management system for cats claimed in claim 4, wherein the weight at a static state start time when the static state starts is the same as the weight at an exit start time when the animal starts to exit the upper container.

6. The animal toilet usage management system for cats claimed in claim 1, wherein the calculating part is configured to calculate differential weight as a body weight, the differential weight being a difference between the weight at an exit start time when the animal starts to exit the upper container and the weight at an exit completed time when the animal completes exiting the upper container.

7. The animal toilet usage management system for cats claimed in claim 1, wherein
a time resolution of a detection function of the four first weight sensors is once every 0.3 to 0.6 seconds.

* * * * *